United States Patent

[19]

van der Plas

[11] Patent Number: 6,108,526

[45] Date of Patent: Aug. 22, 2000

[54] ANTENNA SYSTEM AND METHOD THEREOF

[75] Inventor: Jaap van der Plas, Nieuwegein, Netherlands

[73] Assignee: Lucent Technologies, Inc., Holmdel, N.J.

[21] Appl. No.: 08/852,715

[22] Filed: May 7, 1997

[51] Int. Cl.⁷ .................................................... H04B 1/44
[52] U.S. Cl. ........................ 455/78; 455/504; 455/572; 455/277.1
[58] Field of Search .................................. 455/82, 83, 88, 455/101, 102, 103, 105, 121, 127, 129, 700, 504, 506, 572, 277.1, 132, 78

[56] References Cited

U.S. PATENT DOCUMENTS

| | | | |
|---|---|---|---|
| 4,914,446 | 4/1990 | Lindenmeier et al. | 343/704 |
| 4,977,615 | 12/1990 | Suzuki et al. | 455/277 |
| 5,054,114 | 10/1991 | Erickson | 455/78 |
| 5,138,330 | 8/1992 | Lindenmeier et al. | 343/713 |
| 5,276,920 | 1/1994 | Kuisma | 455/101 |
| 5,289,197 | 2/1994 | Lindenmeier et al. | 343/713 |
| 5,329,555 | 7/1994 | Marko et al. | 375/100 |
| 5,375,257 | 12/1994 | Lampen | 455/83 |
| 5,420,599 | 5/1995 | Erkocevic | 343/828 |
| 5,424,859 | 6/1995 | Uehara et al. | 359/152 |
| 5,430,769 | 7/1995 | Patsiokas et al. | 375/347 |
| 5,475,875 | 12/1995 | Katsuyama et al. | 455/78 |
| 5,566,364 | 10/1996 | Mizoguchi et al. | 455/132 |
| 5,659,885 | 8/1997 | McDonald et al. | 455/78 |
| 5,715,525 | 2/1998 | Tarusawa et al. | 455/78 |
| 5,768,691 | 6/1998 | Matero et al. | 455/78 |
| 5,778,306 | 7/1998 | Kommrusch | 455/78 |
| 5,809,405 | 9/1998 | Yamaura | 455/101 |
| 5,909,641 | 6/1999 | Simmons | 455/78 |

FOREIGN PATENT DOCUMENTS

| | | |
|---|---|---|
| 0218843 A2 | 4/1987 | European Pat. Off. |
| 0 259 129 A2 | 3/1988 | European Pat. Off. |
| 0 314 930 A2 | 5/1989 | European Pat. Off. |
| 0 314 931 A2 | 5/1989 | European Pat. Off. |
| 0529623 A2 | 3/1993 | European Pat. Off. |
| 0558210 A1 | 9/1993 | European Pat. Off. |
| 0605182 A2 | 7/1994 | European Pat. Off. |
| 0605182 A3 | 7/1994 | European Pat. Off. |
| 0620657 A1 | 10/1994 | European Pat. Off. |
| 0 623 967 A1 | 11/1994 | European Pat. Off. |
| 2 237 686 | 5/1991 | United Kingdom. |
| WO 93/13605 | 7/1993 | WIPO. |
| WO 93/21702 | 10/1993 | WIPO. |
| WO 95/06369 | 3/1995 | WIPO. |
| WO 95/11552 | 4/1995 | WIPO. |
| WO 95/13670 | 5/1995 | WIPO. |

OTHER PUBLICATIONS

Computer Assisted Patent Search.
Patent Abstract of Japan, vol. 5, No. 78 (E–058), May 22, 1981 & P 56 027504 A. (Pioneer Elecronic), Mar. 17, 1981, abstract.

*Primary Examiner*—Daniel S. Hunter
*Assistant Examiner*—Darnell R. Armstrong

[57] ABSTRACT

The improved antenna system provides significant cost reduction and improves the modularity of the antenna system by combining the power supply lines and the control lines on a single line. Control circuitry is responsive to a power supply signal which acts as the power supply for the antenna system to control the operation of the antenna system. In certain embodiments, the improved antenna system is connected to a single line which carries communication signals and the power supply signal. As such, the antenna system combines the communication lines, the power supply lines and control lines to provide a modular antenna system at a reduced cost. In controlling the antenna system, the control circuitry can control the operation of signal circuitry, which handles the communication signals, in response to the control information provided by the power supply signal. The control circuitry can control other features of the antenna system, such as antenna diversity circuitry, in response to the power supply signal. The control information can be provided by the power supply signal in a variety of forms, such as power supply bias voltage levels and/or interruptions in the power supply signal. The control circuitry responds to the control information to control the operation of the antenna system in a desired manner.

9 Claims, 2 Drawing Sheets

ANTENNA SYSTEM AND METHOD THEREOF

BACKGROUND OF THE INVENTION

1. Field of the Invention

This invention relates to wireless communication systems and, more particularly, to an improved antenna system.

2. Description of Related Art

Active antennas are commonly used where a connection cable between the antenna and the base transceiver have an unacceptable loss of signal. Active antenna systems solve this problem by amplifying the signal level before the lossy cable. Usually active antenna systems are utilized in low frequency, receive only applications. An active antenna system typically requires an RF signal line and a power supply line. For cost reduction purposes, current active antenna systems combine the power supply line and the signal line in one line, usually a coaxial cable. If switching between a transmit mode and a receive mode is required, the antenna system requires a separate control line to control the RxTx switching.

Antenna diversity is typically provided by antenna systems where the receiver selects a particular antenna out of a set of antennas. Antenna diversity assists in coping with multipath fading of a received signal whereby the signals received by each antenna are compared, and the antenna having the better reception or the best signal quality (for example, signal-to-noise ratio) as measured by the base transceiver is selected. A diversity antenna system requires additional control lines for antenna selection. A diversity antenna system is described in U.S. Pat. No. 5,420,599 to Erkocevic which provides antenna diversity in the receive mode. This diversity antenna system combines the control signals for switching between the transmit and receive modes and for antenna selection. This system uses extraneous control lines. Requiring separate wiring for control signals increases costs and reduces the modularity of the antenna system.

Thus, a need exists for an antenna system that overcomes the drawbacks of current systems in a cost effective manner.

SUMMARY OF THE INVENTION

The improved antenna system provides significant cost reduction and improves the modularity of the antenna system by combining the power supply lines and the control lines on a single line. Control circuitry is responsive to a power supply signal which acts as the power supply for the antenna system to control the operation of the antenna system. In certain embodiments, the improved antenna system is connected to a single line which carries communication signals and the power supply signal. As such, the antenna system combines the communication lines, the power supply lines and control lines to provide a modular antenna system at a reduced cost. In controlling the antenna system, the control circuitry can control the operation of signal circuitry, which handles the communication signals, in response to the control information provided by the power supply signal. The control circuitry can control other features of the antenna system, such as antenna diversity circuitry, in response to the power supply signal. The control information can be provided by the power supply signal in a variety of forms, such as power supply bias voltage levels and/or interruptions in the power supply signal. The control circuitry responds to the control information to control the operation of the antenna system in a desired manner.

In accordance with certain embodiments of the present invention, the signal circuitry can include transmit circuitry and/or receive circuitry, and depending on the embodiment, the improved antenna system can provide antenna diversity. In certain embodiments combining an active antenna system with antenna diversity, the active diversity antenna system includes control circuitry which is responsive to the power supply bias voltage on the line to control the active antenna system and also to provide antenna diversity. In one such embodiment, the active diversity control circuitry accomplishes this by controlling the operation of the signal circuitry (transmit circuitry and/or receive circuitry) and the switching between antennas in response to the bias voltage on the line.

In a particular embodiment involving a modular transceiver application, the signal circuitry includes both transmit circuitry and receive circuitry. When the bias voltage is at a first level, the active diversity control circuitry enters a transmit mode, thereby enabling the transmit circuitry and disabling the receive circuitry such that the transmit circuitry transmits the communication signals on the line using a selected or default active antenna. When the bias voltage is at a second level, the active diversity control circuitry enters a receive mode, thereby enabling the receive circuitry and disabling the transmit circuitry such that the receive circuitry receives communication signals from a selected active antenna. The active diversity control circuitry provides antenna selection signal(s) to select an antenna from the plurality of antennas to provide antenna diversity also in response to the bias voltage on the line.

In accordance with alternative embodiments and features involving the present invention, an improved antenna system provides antenna diversity to the transmit circuitry in the transmit mode. Additionally, a local power control loop of the transmit circuitry maintains the output power level of the transmit circuitry relatively constant in that the output power level will remain in a certain range depending on the implementation independent of power loss in the line between the base and the antennas. In a transceiver embodiment, the control circuitry includes control circuitry which selects an antenna in the receive mode, and the selected antenna is maintained for the transmit mode. In certain embodiments, the control circuitry resets to a default antenna when entering the receive mode from the idle mode. The antenna diversity feature can be provided in certain embodiments by toggling between two antennas in the receive mode due to short bias voltage interruptions.

BRIEF DESCRIPTION OF THE DRAWINGS

Other aspects and advantages of the present invention may become apparent upon reading the following detailed description and upon reference to the drawings in which.

DETAILED DESCRIPTION OF THE DRAWINGS

Two illustrative embodiments of the improved antenna system according to the principles of the present invention are described below in which control circuitry responds to the power supply signal to control the operation of the antenna system. In these particular embodiments, an active diversity antenna system is implemented using the principles of the present invention to provide an improved antenna system with active antennas employing antenna diversity at a reduced cost and with improved modularity.

Figure 1:
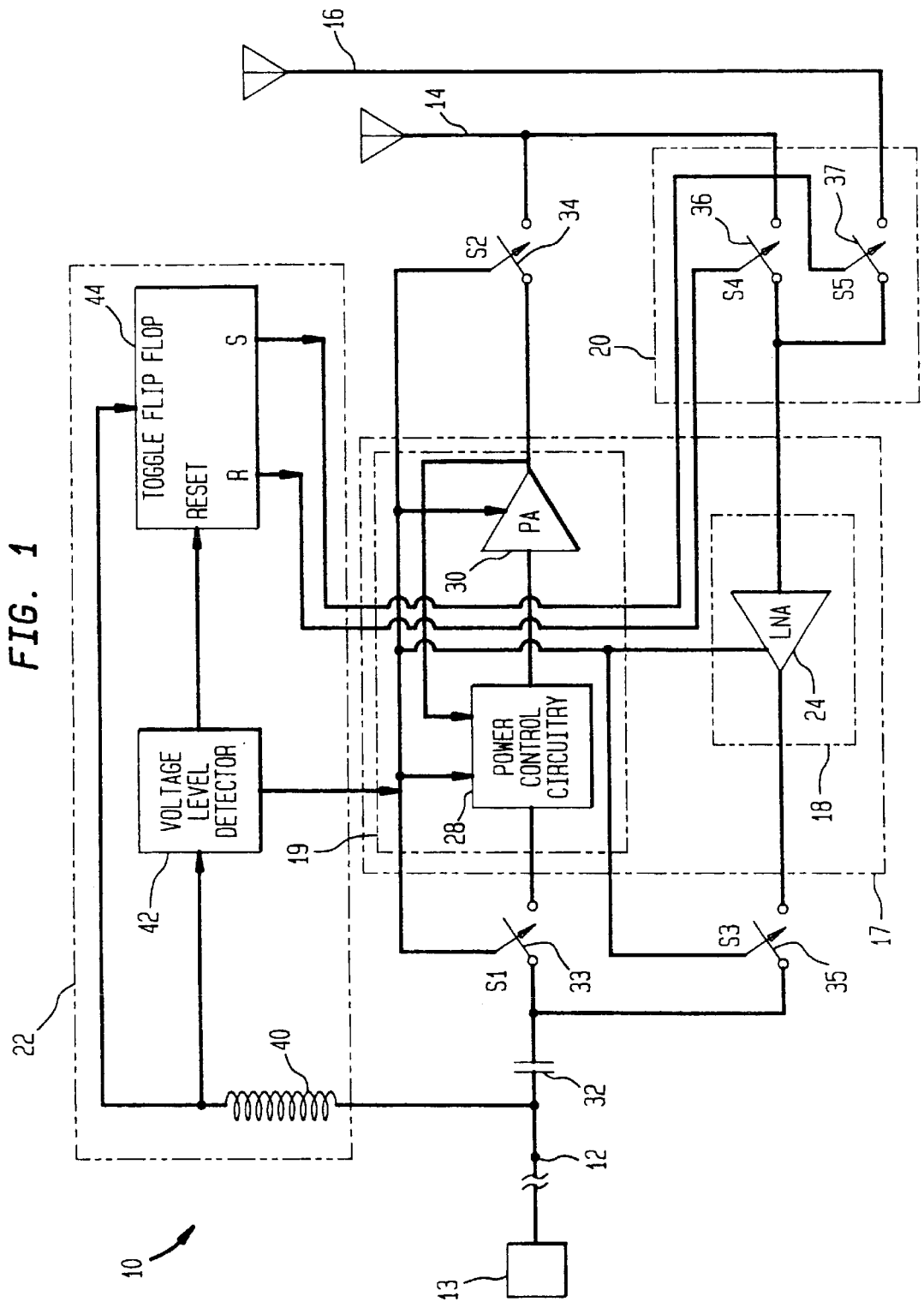
FIG. 1 shows a block diagram of an embodiment of an improved antenna system according to principles of the present invention.

FIG. 1 shows a block diagram of a transceiver embodiment of the active diversity antenna system 10, where diversity is restricted to the receive mode only. The active diversity antenna system 10 is coupled to a line 12, such as a coaxial cable, twisted pair or twin cable, having a power supply signal and communication signals in this particular embodiment. The base transceiver station 13 coupled to the line 12 provides in this particular embodiment the power supply signal as a bias voltage. In this particular embodiment, the antenna system includes first and second antennas 14 and 16. The signal circuitry 17 includes receive circuitry 18, which is coupled through an antenna selection switching arrangement 20 to the first and second antennas 14 and 16, and transmit circuitry 19. In receive mode for this particular embodiment, the control circuitry 22 disables the transmit circuitry 19 and enables the receive circuitry 18 such that the receive circuitry 18 receives communication signals from a selected antenna of the first and second antennas 14 and 16. In this particular embodiment, the receive circuitry 18 includes low-noise preamplifiers (LNA) 24.

In transmit mode for this particular embodiment, the control circuitry 22 disables the receive circuitry 18 and enables the transmit circuitry 19 such that the transmit circuitry 19 transmits communication signals from the base station 13 using the default transmit antenna element 14. In this particular embodiment, the transmit circuitry 19 comprises a power control loop which includes power control circuitry (PC) 28 and an RF power amplifier (PA) 30. The power control loop circuitry provides for relatively constant output power level within a certain range of input power levels. As such, the output power level fluctuates within a certain range depending on the implementation independent of the power losses in the line between the base station 13 and the antennas 14 and 16.

The power control loop accomplishes this relatively constant output power level independent of losses by having the power control circuitry 28 determine the output power level of the power amplifier by simply sensing the output from the power amplifier 30. In response to the determined output power level, the power control circuitry 28 can regulate the power amplifier 30 by attenuating the input signal or controlling the gain of the power amplifier 30. The power control circuitry 28 is especially important if the PA 30 operates as a linear amplifier. Without the power control circuitry 28, the PA 30 could operate outside the linear range, and a variation in the input signal could become extremely large. With the power control circuitry 28, the power control loop maintains a constant output power independent of the cable loss. The active diversity antenna system 10 also includes a dc block 32 and switches 33–37.

The active diversity antenna system 10 has three modes of operation, which are controlled by the bias voltage on the coaxial line 12 in this particular embodiment. The control circuitry 22 is responsive to the bias voltage levels provided by the base station 13 on the line 12 and controls the operation of the active diversity antenna system 10 of this particular embodiment according to the following modes:

Idle mode. The active diversity antenna system is in idle mode at a first bias voltage level (for example, 0V) on the line 12;

Receive mode. A second bias voltage (for example, +3V) puts the active diversity antenna system 10 in receive mode. When entering receive mode from idle mode, or optionally also from transmit mode, the default antenna, 14 or 16, is selected. If the bias voltage is interrupted for a short period of time (for example, within a range of less than 1 $\mu$s to more than 1 msec depending on the speed of the control circuitry 22), the active diversity antenna control circuitry 22 toggles between both antennas 14 and 16; and Transmit mode. A third bias voltage (for example, +5V) puts the active diversity antenna system 10 in transmit mode.

Alternatively, the control circuitry 22 can put the antenna system 10 in one of the above modes or additional modes by other chosen power supply signal states or characteristics, for example, different voltage levels, negative voltage levels, or interruptions in the power supply signal, interruptions in the power supply signal of different durations, and/or changes in power supply signal states at certain time intervals and/or of certain durations. Thus, an important feature is that the power supply signal is providing the control information and can do so in a variety of ways.

In this particular embodiment, the control circuitry 22 includes a signal blocking choke 40, a voltage level detector 42 and a toggle flip-flop 44 that is triggered by short interruptions in its supply voltage. The level detector 42 senses the bias voltage and provides control signals to the signal circuitry 17. In this particular embodiment, when the bias voltage is high (transmit mode), the voltage level detector 42 enables the transmit circuitry 19 with a transmit enable signal and disables the receive circuitry 18 with a receive disable signal which could be an inverted transmit enable signal. Meanwhile, the level detector 42 resets the flip-flop 44 thereby disabling the outputs of the flip-flop 44. In this particular embodiment, the disabled outputs of the reset flip-flop 44 open the antenna diversity switches (S4) 36 and (S5) 37 of the antenna diversity switching arrangement 38, thereby isolating the receiver circuitry 18.

Additionally, in this particular embodiment, the control signals from the voltage level detector 42 control a first switch (S1) 33 between the dc block 32 and the transmit circuitry 19 and a second switch (S2) 34 between the transmit circuitry 19 and the default transmit antenna 14. The first and second switches 33 and 34 close in response to the transmit enable signal from the voltage level detector 42. A third switch (S3) 35, between the dc block 32 and the receive circuitry 18, opens in response to the receive disable signal to isolate the receive circuitry 18.

In this particular embodiment, when the bias voltage is low (receive mode), the voltage level detector 42 enables the receive circuitry 18 with a receive enable signal and disables the transmit circuitry 26 with a transmit disable signal which could simply be an inverted receive enable signal. When the control circuitry 22 enters the receive mode from the idle mode, the outputs of the flip-flop 44 are set to a known value to select a default antenna 14 or 16. The outputs of the flip-flop 44 select one of the antennas 14 and 16 by controlling the antenna diversity switches 36 and 37. The antenna diversity switch associated with the selected antenna is closed by the output of the flip-flop 44, and the remaining antenna diversity switches associated with non-selected antennas are open by the output of the flip-flop 44. In this particular embodiment, short interruptions in the bias voltage trigger the flip-flop 44, thereby toggling the outputs of the flip-flop 44 to select a different antenna 14 or 16. Alternatively, antenna selection can be triggered by other chosen power supply signal states or characteristics, for example, different voltage levels, negative voltage levels, or interruptions in the power supply signal, interruptions in the power supply signal of different durations, and/or changes in power supply signal states at certain time intervals. As such, the power supply signal is providing control information on antenna selection. The switch 35 closes in response to the receive enable signal to provide a receive path for the antenna signals. Additionally, in this particular embodiment, a transmit disable signal which could be an inverted receive enable signal from the voltage level detector 42 opens the switches 33 and 34, thereby isolating the transmit circuitry 19.

Alternative configurations of this active diversity antenna system 10 are possible which use a different number of components or different components to perform under the above-described control scheme or a variation thereof. For example, the enabling, disabling and/or the isolation of the signal circuitry 17 and antenna selection can be implemented in a variety of ways. In this particular embodiment where diversity is limited to the receive mode, the control of the switches 33–37, the receive circuitry 18 and the transmit circuitry 19 by the control circuitry 22 is detailed in Table 1.

TABLE 1

Control of switches, receive and transmit circuitry

|  | Transmit | receive antenna 1 | receive antenna 2 |
| --- | --- | --- | --- |
| S1 (33) | close | open | open |
| S2 (34) | close | open | open |
| S3 (35) | open | close | close |
| S4 (36) | open | close | open |
| S5 (37) | open | open | close |
| LNA (24) | off | on | on |
| PA/PC (19) | on | off | off |

Figure 2:
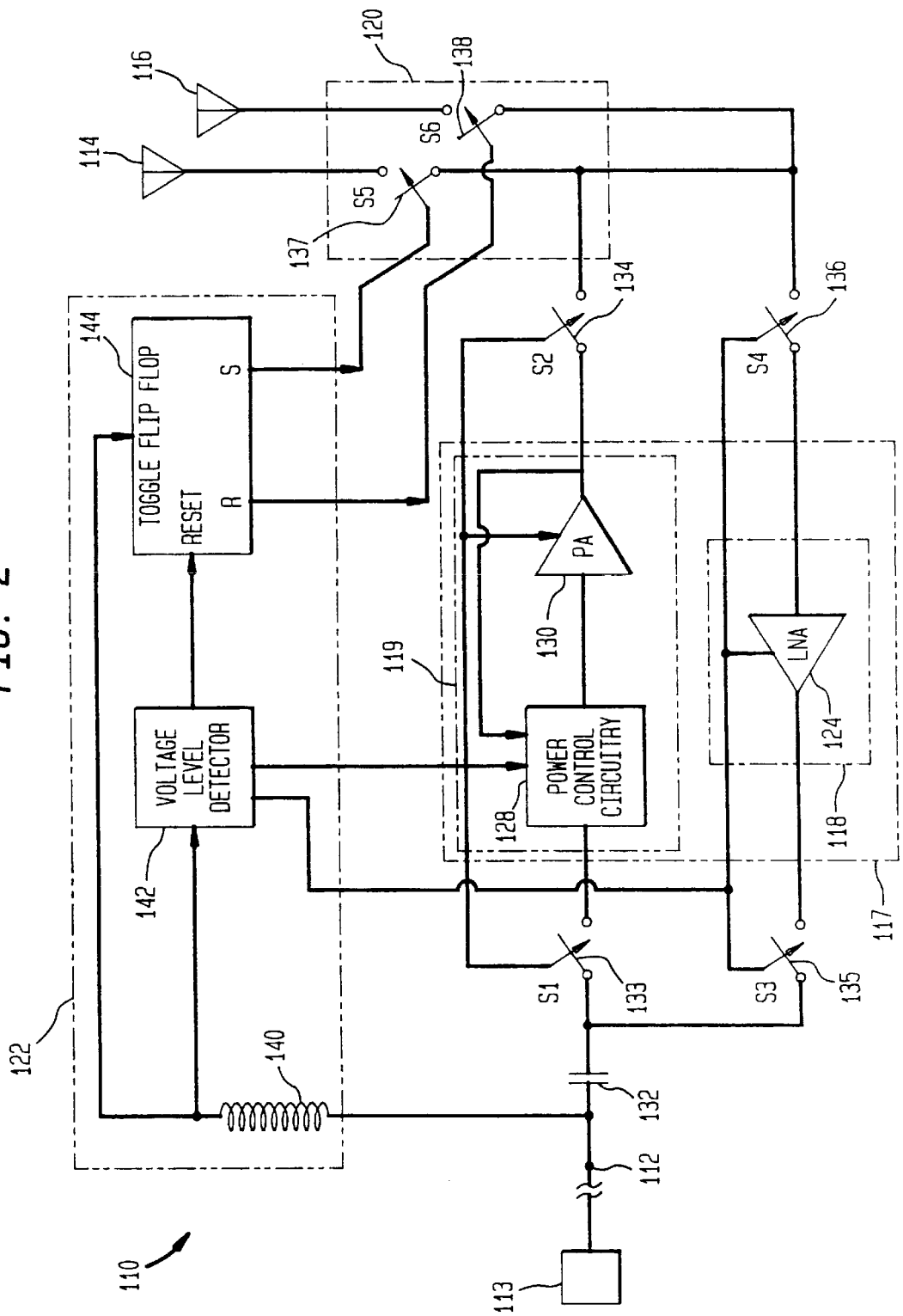
FIG. 2 shows a block diagram of an alternative embodiment of an active diversity antenna system according to the principles of the present invention.

FIG. 2 shows a block diagram of an alternative embodiment of the active diversity antenna system according to the principles of the present invention, where antenna diversity is applied in both the transmit and receive modes. The active diversity antenna system 110 is coupled to a line 112, such as a coaxial cable, having communications signals and a power supply bias voltage which is provided by base transceiver station 113 in this particular embodiment. The antenna system includes first and second antennas 114 and 116. The signal circuitry 117 includes receiver circuitry 118 and transmit circuitry 119 which are coupled through an antenna selection switching arrangement 120 to the first and second antennas 114 and 116. In receive mode for this particular embodiment, the control circuitry 122 disables the transmit circuitry 119 and enables the receive circuitry 118 such that the receive circuitry 118 receives communication signals from a selected antenna of the first and second antennas 114 and 116. As in the previous embodiment, the receive circuitry 118 includes low-noise preamplifiers (LNA) 124.

In the transmit mode for this particular embodiment, the control circuitry 122 enables the transmit circuitry 119 such that the transmit circuitry 119 transmits communications signals from the base station 113 using the selected antenna of the antennas 114 and 116. As described above for the previous embodiment, the transmit circuitry 119 includes a power control loop comprising power control circuitry (PC) 128 and an RF power amplifier (PA) 130. Additionally, the active diversity antenna system 110 includes a dc block 132 and switches 133–138.

As in the previous embodiment, the active diversity antenna system 110 has three modes of operation, which are controlled by the power supply bias voltage level provided by the base station 113 on the coaxial line 112 in this embodiment. The control circuitry 122 is responsive to the bias voltage on the line 112 and controls the operation of the active diversity antenna system 110 of this particular embodiment according to the following modes:

Idle mode. The active diversity antenna system 110 is in idle mode at a first bias voltage level (for example, 0V) on the line 112.

Receive mode. A second bias voltage (for example, +3V) puts the active diversity antenna system 110 in receive mode. When entering the receive mode from the idle mode, a default antenna is selected in this particular embodiment. If the bias voltage is interrupted for a short period of time (for example, an interruption in the range of less than 1 $\mu$s or greater than 1 ms depending on the implementation), the active diversity control circuitry selects another one of the antennas 114 and 116.

Transmit mode. A third bias voltage (for example, +5V) puts the active diversity antenna system 110 in transmit mode using the antenna previously selected in the receive mode. Antenna toggling or selection in the transmit mode can be done. In this particular embodiment, determining which of the antennas 114 and 116 has the better signal quality is done in the receive mode.

Alternatively, the control circuitry 122 can put the antenna system 110 in one of the above modes or additional modes by other chosen power supply signal states or characteristics, for example, different voltage levels, negative voltage levels, or interruptions in the power supply signal, interruptions in the power supply signal of different durations and/or changes in power supply signal states at certain time intervals and/or durations. Thus, as stated above, an important feature is that the power supply signal is providing the control information and can do so in a variety of ways.

In this embodiment, the control circuitry 122 includes a signal blocking choke 140, a voltage level detector 142 and a toggle flip-flop 144. The voltage level detector 142 senses the bias voltage, and when the bias voltage is high (transmit mode), the voltage level detector 142 provides control signals which enable the transmit circuitry 119 and disable the receive circuitry 118. In the transmit mode of this particular embodiment, the outputs of the flip-flop 144 to the antenna selection arrangement 120 maintain the antenna selected in the receive mode. In this particular embodiment, the antenna selection arrangement includes the antenna diversity switches 137 and 138 which are connected to respective ones of the antennas 114 and 116. According to the outputs of the flip-flop 144, the antenna diversity switch associated with the selected antenna is closed by the output of the flip-flop 144, and the remaining antenna diversity switches associated with non-selected antennas are opened by the output of the flip-flop 144.

Additionally, the control signals from the voltage level detector 142 control a first switch (S1) 133 between the dc block 132 and the transmit circuitry 119 and a second switch (S2) 134 between the transmit circuitry 119 and the antenna selection switches 137 and 138. In the transmit mode for this particular embodiment, the control signals from the active diversity control circuitry 122 close the first and second switches 133 and 134 to permit transmission, and open a third switch (S3) 135 and a fourth switch (S4) 136 to isolate the receive circuitry 118.

In this particular embodiment, when the bias voltage is low (receive mode), the voltage level detector 142 enables the receive circuitry 118 and disables the transmit circuitry 119. In this particular embodiment, the voltage level detector 142 provides a reset signal to the flip-flop 144 when the control circuitry 22 enters the receive mode from the idle mode. The reset signal resets the outputs of the flip-flop 144 to the antenna selection arrangement 120 so that the switches 137 and 138 select a chosen default antenna 114 or 116. The outputs of the flip-flop 44 can also be reset to select an arbitrary default antenna 114 or 116. In this particular embodiment, the flip-flop 144 is responsive to the bias voltage on the line 112 such that short interruptions in the bias voltage cause the output of the flip-flop 144 to change, thereby causing the selection of another antenna 114 or 116. Alternatively, the control circuitry 122 can select antennas according to other chosen power supply signal states or characteristics, for example, different voltage levels, negative voltage levels, or interruptions in the power supply signal, interruptions in the power supply signal of different durations and/or changes in power supply signal states at certain time intervals and/or durations. Additionally, in the receive mode, the voltage level detector 142 closes the third and fourth switches 135 and 136 to permit reception, and opens the switches 133 and 134 when the transmit circuitry 119 is disabled to isolate the transmit circuitry 119.

Alternative configurations of the antenna system are possible which use a different number of components or different components to perform under the above-described control scheme or a variation thereof. For example, the enabling, disabling, and isolation of the signal circuitry 117 and antenna selection can be implemented in a variety of ways. In this particular embodiment where diversity is used in both the transmit and receive modes, the control of switches 133–138, the receiver circuitry 118 and the transmit circuitry 126 is listed in Table 2.

TABLE 2

Control of switches, receiver circuitry and transmitter circuitry

|  | Transmit ant. 1 | transmit ant. 2 | receive ant. 1 | receive ant. 2 |
| --- | --- | --- | --- | --- |
| S1 (133) | close | close | open | open |
| S2 (134) | close | close | open | open |
| S3 (135) | open | open | close | close |
| S4 (136) | open | open | close | close |
| S5 (137) | close | open | close | open |
| S6 (138) | open | close | open | close |
| LNA (124) | off | off | on | on |
| PA/PC (119) | on | on | off | off |

Thus, the active diversity antenna system incorporates various aspects of the present invention. According to principles of the present invention, the improved antenna system combines the functions associated with power supply lines and control lines into a single line, for example, coaxial cables, twisted pair, twin cable and any other line capable of performing these functions. The antenna system accomplishes this in the transceiver embodiments described above by switching between the transmit mode and the receive mode in response to the bias voltage on the line. Moreover, the antenna system provides antenna diversity by switching between antennas also in response to the bias voltage. Combining the power supply and control lines as well as the communication signal line into a single line reduces costs and the number of components, including the number of connectors. The less components also improves the size efficiency for the active diversity antenna, and reducing the connections between the antenna system and the base transceiver to a single line improves the modularity of the system. Additionally, the local power control circuitry in the active antenna embodiments makes output power level independent of losses in the line. Finally, in accordance with certain aspects of the present invention, resetting to the default antenna when entering the receive mode from the idle mode provides a simple yet effective active diversity scheme.

Alternative configurations of this improved antenna system are possible which omit or add components or use different components in performing the control scheme according to principles of the present invention or a variation thereof. For example, the number of switches or the switching arrangement could be changed. Moreover, the above-described embodiments have two antennas for antenna diversity, but the diversity feature could employ more antennas, or a single antenna with different feeding points. Some embodiments could not have antenna diversity. Certain embodiments could use a variation of the control circuitry, such as replacing the toggle-flip-flop with other circuitry, such as a counter.

Additionally, the control circuitry has been described as being comprised several simple components, but it should be understood that the antenna system and portions thereof can be employed using application specific integrated circuits, software driven processing circuitry, or other arrangements of discrete components. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. An active diversity antenna system connected to a line carrying a power supply bias voltage and communication signals, said antenna system comprises:

a plurality of antennas;

signal circuitry coupled between said line and at least one selected antenna of said plurality of antennas; and control circuitry responsive to said bias voltage on said line, said control circuitry provides control signals to said signal circuitry in response to said bias voltage, said control circuitry further provides antenna selection signals to select said selected antenna of said plurality of antennas in response to said bias voltage;

wherein said control circuitry includes a toggle flip-flop coupled to antenna selection switches, said toggle flip-flop being responsive to interruptions in said bias voltage to produce antenna selection signals;

wherein said flip-flop is responsive to a reset signal from said voltage level detector to set said antenna selection signals to a default antenna of said plurality of antennas.

2. An antenna system connected to a line carrying a power supply bias voltage and communication signals, said antenna system comprises:

a plurality of antennas;

transmit circuitry coupled to said line and at least one of said plurality of antennas, said transmit circuitry transmits said communication signals using at least said one antenna when said transmit circuitry is enabled;

receive circuitry coupled between said line and said plurality of antennas, said receive circuitry receives said antenna signals from a selected antenna of said plurality of antennas when said receive circuitry is enabled; and control circuitry responsive to said bias voltage on said line, said control circuitry provides a transmit enable signal to said transmit circuitry when said bias voltage is at a first level and provides a receive enable signal to said receive circuitry when said bias voltage is at a second level, said control circuitry further provides antenna selection signals to select said selected antenna of said plurality of antennas in response to said bias voltage;

wherein said control circuitry includes:

a voltage level detector responsive to said bias voltage and coupled to said transmit circuitry, said voltage level detector provides a transmit enable signal to said transmit circuitry when said bias voltage is at a first level, and a toggle flip-flop provides antenna selection signals to select said selected antenna of at least said first and second antennas in response to said bias voltage.

3. An antenna system connected to a line carrying a power supply signal providing power to said antenna system, said antenna system comprising:

control circuitry configured to switch said antenna system between at least a transmit mode and a receive mode in response to said power supply signal; and signal circuitry including transmit circuitry for providing communication signals to at least one antenna when said transmit circuitry is enabled and receive circuitry for receiving communication signals from said at least one antenna when said receive circuitry is enabled, said signal circuitry being responsive to said control circuitry by enabling said transmit circuitry and disabling said receive circuitry when said antenna system is in said transmit mode and by disabling said transmit circuitry and enabling said receive circuitry when said antenna system is in said receive mode, wherein said control circuitry includes a toggle flip-flop responsive to interruptions in said power supply signal to produce antenna selection signals.

4. The system of claim 3, further comprising:

a plurality of antennas; wherein said signal circuitry receives communication signals from a selected antenna of said plurality of antennas when in said receive mode; and said control circuitry provides antenna selection signals in response to said power supply signal to select said selected antenna of said plurality of antennas.

5. The system of claim 3, further comprising:

a plurality of antennas; wherein said signal circuitry provides communication signals to a selected antenna of said plurality of antennas when in said transmit mode; and said control circuitry provides antenna selection signals in response to said power supply signal to select said selected antenna of said plurality of antennas.

6. The system of claim 3, wherein said control circuitry includes a voltage level detector coupled to said signal circuitry to produce control signals to said signal circuitry depending on the voltage level of said bias voltage.

7. A method of controlling an antenna system connected to a line carrying a power supply signal providing power to said antenna system, comprising:

switching between a receive mode for receiving communication signals from at least one antenna and a transmit mode for transmitting communication signals over an antenna in response to said power supply signal; and providing antenna selection signals in response to interruptions in said power supply signal to select one of a plurality of antennas for providing connection between signal circuitry and said one of a plurality of antennas.

8. A method of controlling an antenna system connected to a line carrying a power supply signal providing power to said antenna system, comprising:

switching between a receive mode for receiving communication signals from at least one antenna and a transmit mode for transmitting communication signals over an antenna in response to said power supply signal; and detecting the level of said power supply signal on said line; and producing control signals in response to said level of said power supply signal to switch between said transmit mode and said receive mode.

9. The method of claim 8, further comprising:

producing output signals on said line using at least said power supply signal;

determining the output power level of said output signals; and responding to said output power level to maintain said output signals at a constant power level.

* * * * *